Figure 1:
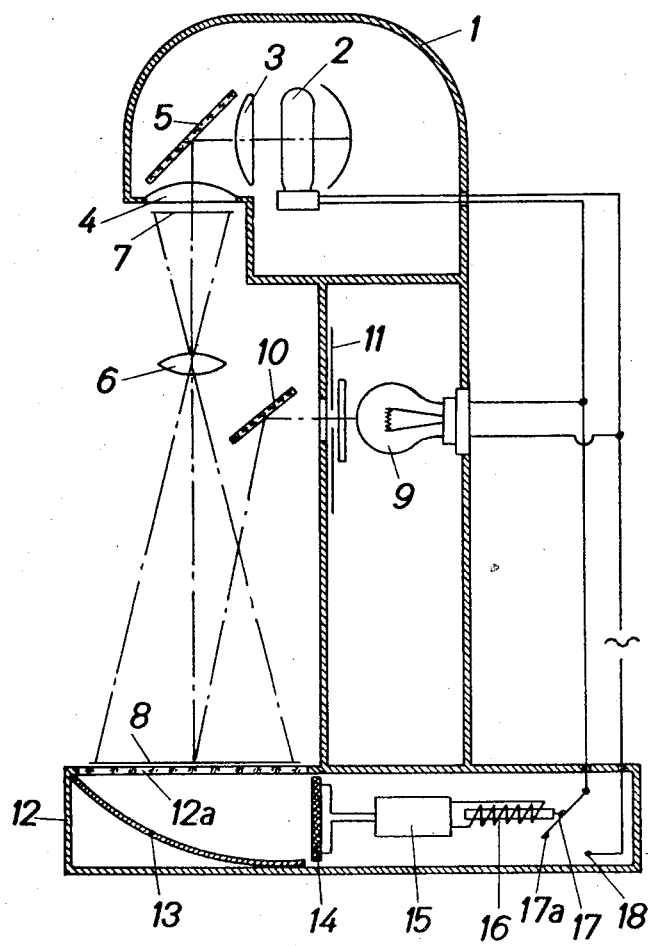

Sept. 30, 1958 F. BIEDERMANN ET AL 2,853,921
APPARATUS FOR PHOTOGRAPHIC PRINTING
Filed Oct. 18, 1955 2 Sheets-Sheet 1

INVENTORS:
Friedrich Biedermann, Karl Huber, and Richard Wick
BY
*their attorneys*

United States Patent Office

2,853,921
Patented Sept. 30, 1958

2,853,921

APPARATUS FOR PHOTOGRAPHIC PRINTING

Friedrich Biedermann, Munich-Unterhaching, and Karl Huber and Richard Wick, Munich, Germany, assignors to AGFA Aktiengesellschaft, Leverkusen-Bayerwerk, Germany, a corporation of Germany Application October 18, 1955, Serial No. 541,258

Claims priority, application Germany October 28, 1954

6 Claims. (Cl. 88—24)

This invention relates to apparatus for photographic printing of pictures and in particularly to a photographic enlarger.

Photographic printing methods are known in which the gradation of the light-sensitive material can be varied by means of direct exposure to light of the positive material in addition to exposing it to the main printing light required to produce the positive image. In the application of this method to enlargers it is known to derive this additional light by means of deflecting mirrors from the light used for printing the negative, or else to use a separate, additional source of light. The range of gradation variation achievable in this manner depends on the relation of the amount of additional light to the amount of light passing through the negative. In this connection it is of importance that the total amount of light incident upon the light-sensitive material should remain constant, that is to say that the amount of the main printing light reaching the light-sensitive material through the negative must be reduced by the amount of the additional light used. With the known enlargers this is done by equipping the sources supplying the main printing light and the additional light with dimming devices such as diaphrams or grey wedges which are so coupled that they regulate the relation between the main printing light and the additional light. It will be readily realized that such an arrangement requires a number of complicated coupling members which render the apparatus cumbersome and expensive.

The present invention aims at overcoming these disadvantages by using the main printing light and additional light incident upon the light-sensitive material as measuring light for a photoelectric device regulating the exposure of the light-sensitive material. To regulate the amount of additional light required to achieve the desired gradation, an adjustable dimming device in the form of a diaphragm or a grey wedge is arranged in the path of the light from the additional light source.

Compared with the known apparatus such an arrangement has the advantage that no dimming device is needed in the path of the main printing light for the reduction of the amount of printing light in view to the additional exposure of the light-sensitive material and therefore no coupling members are needed for setting such a dimming device. Since the amount of light reaching the light-sensitive material is utilized to control the main printing light, all that is needed to perform the printing method mentioned above is to provide a source of additional light.

Other and further objects and advantages of the invention will appear as the description proceeds. The inventive idea involved is capable of receiving a variety of expressions, some of which, for purpose of illustration, are shown in the accompanying drawings, but it is expressively understood that said drawings are employed merely to facilitate the description of the invention as a whole and not to define the limits thereof, reference is being made to the appended claims for this purpose. In the drawings Fig. 1 is a diagrammatic representation of an enlarger having an additional light source and an exposure regulating device according to the invention, and Fig. 2 is a diagrammatic representation of a modified form of the invention.

Figure 2:
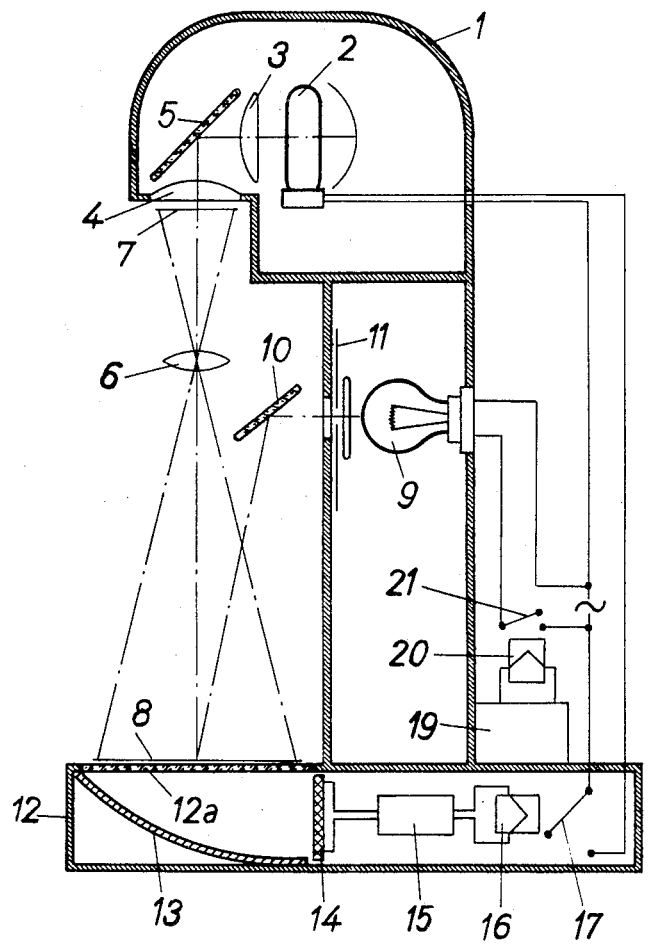

As illustrated in Fig. 1 of the drawings the enlarger comprises a lamp housing 1 with projection bulb 2 which produces on the light-sensitive material 8 an enlarged image of a negative 7 with the aid of condenser 3, 4, a deflection mirror 5 and a lens 6. The printing paper 8 may be pulled from a large supply roll (not shown) situated beside a box 12 where the paper to be exposed is placed on a transparent support 12a. To vary the gradation of the paper with the aid of additional light, a separate light soure 9 is so arranged that its rays reach the light-sensitive material 8 via a deflecting mirror 10 without passing through the negative 7. An adjustable diaphragm 11 is inserted in the path of the rays emanating from the light source 9 for the purpose of varying the intensity of the light coming from the lamp 9 and falling upon the light-sensitive material 8. The two light bulbs 2, 9 are connected in parallel to a suitable current supply.

In the box 12 is housed a known photoelectric exposure regulating device which automatically regulates the quantity of light falling upon the light-sensitive material 8 in accordance with the density of the negative 7. The photoelectric regulating device comprises a photoelectric cell 14 which receives the light passing through the light-sensitive material 8 and being reflected by a reflector 13. The cell 14 which may be combined with a multiplier, is connected to an electronic regulating device represented by the rectangle 15 and including an electric condenser which will be charged under the influence of the current of the photoelectric cell. This regulating device is known in the art and may be, for example, of the type described in Phototubes by Radio Corporation of America, Form PT-2OR1, 3-48, copyright 1940, page 14, Fig. 12. The regulating device 15 is in connection with a relay 16 which controls a switch 17 arranged in the current supply circuit of the printing light source 2 and the additional light source 9.

In Fig. 1 the switch 17 is shown in the off-position. When an exposure is to be made the diaphragm 11 in the path of the light rays coming from the additional light source 9 is set to a value corresponding to the gradation of the light-sensitive material, which is wanted in view to the negative to be printed. Then the regulating device 15 will be switched on by means of a push button (not shown in the drawings) whereby the relay 16 is energized. The energization of relay 16 causes switch 17 to turn to the right so that two contacts 17a, 18 are closed and the bulbs 2, 9 light up at the same time. When the quantity of light, which is predetermined by the photoelectric exposure regulating device, has fallen upon the light-sensitive material 8, said regulating device 15 causes disenergization of the relay 16 so that the switch 17 turns to the left and the two light bulbs 2, 9 are turned off from the current supply at the same time The automatic exposure regulating device ensures the constancy of the exposure for a negative of a particular density, irrespective of the proportional amounts of main printing light and additional light, since the cell 14 merely deals with the total amount of light falling upon the light sensitive material 8.

A modified form of the invention is illustrated in Fig. 2 of the drawings, in which there is also shown an enlarger and in which parts corresponding to those in Fig. 1 are provided with analogous reference numbers.

In contradistinction to the first described form of the invention, in Fig. 2 the switch 17 controlled by the relay 16 of the automatic exposure regulating device is inserted only in the current supply circuit of the printing light source 2 but not in the current supply circuit of the additional light source 9. Further there is provided an electronic timer represented by the rectangle 19. That timer is known in the art and may be, for example, of the type described in U. S. Patent 2,434,157. To the timer 19 is connected a relay 20 controlling a switch 21 which is arranged in the current supply circuit of the additional light source 9. The regulating device 15 and the timer 19 are connected to a suitable current supply (not shown in the drawings).

The above mentioned device is set in operation by operating a push button (also not shown) whereby the electronic regulating device 15 and the timer 19 are switched on and therefore the relays 16 and 20 are energized. The energization of relays 16, 20 causes closing of the switches 17, 21 whereby the printing light source 2 and the additional light source 9 light up at the same time.

At the end of the time interval set at the timer said timer interrupts current through relay 20 whereby switch 21 is opened and the light source 9 is turned off. Independently thereof the switch 17 remains closed until the predetermined total quantity of light coming from both the bulbs 2 and 9 has reached the light-sensitive material 8. Then the electronic regulating device causes interruption of current through the relay 16 so that the switch 17 is opened and the printing bulb 2 is turned off.

The intensity of radiation of the additional light source 9 is so adjusted that the timer 19 may be set to a value of time interval which is shorter than the shortest exposure time occurring when negatives of small density are printed. For this reason the additional light source 9 is turned off earlier than the printing light source 2 in every case.

Preferably the value of the time interval which is set at the timer 19 is not varied when light-sensitive material of the same characteristic is used for the printing of different negatives. But said value of the time interval which is set at the timer 19 can be varied when, for example, light-sensitive materials of different sensitivity are used.

In a further modification of the invention the sources of the printing light and the additional light may be realized by one light bulb. One part of the light rays emitted by said bulb falls upon the negative 7 while the other part of the light rays emitted by said bulb falls—by use of additional reflectors—upon the reflector 10 which directs said light rays to the light-sensitive material 8. In the case of controlling the additional exposure light independently from the printing light corresponding to the device shown in Fig. 2 of the drawings, in the path of the additional light rays may be arranged a shutter operated by the timer 19.

The invention is not limited for the use in enlargers but may also be realized in combination with contact printing apparatus whereby, for example, the printing light source and the additional light source are arranged at different sides of the light sensitive material. In that case the printing light falls upon the photoelectric cell of the automatic exposure regulating device after passing through the light-sensitive material and the additional light after reflection at said light sensitive material.

In a modified form of the invention the additional exposure of the light-sensitive material takes place previous to the main printing exposure whereby the electrical energy being equivalent to the light energy of the additional exposure is stored up in the electrical condenser of the exposure regulating device until the main printing exposure takes place.

What is claimed is:

1. An apparatus for producing photographic prints from a transparency on light-sensitive printing material comprising a first light source for producing printing light which impinges on the printing material after having passed through the transparency to be printed, a second light source for producing additional light which impinges on the printing material without having passed through said transparency, adjustable means for varying the amount of additional light falling upon the printing material in the course of a printing process, a device for reducing the amount of effective printing light in direct relationship to said amount of additional light so that the sum of all the printing and additional light falling upon the printing material in the course of a printing process is a predetermined quantity independent of the variable amount of additional light, said device including photoelectric exposure regulating means having photoelectric cell means positioned for measuring the quantity of printing and additional light impinging upon said printing material, said photoelectric exposure regulating means controlling said first light source for automatically interrupting the exposure of said printing material by said printing light after a predetermined total quantity of both said printing light and said additional light has fallen onto said photoelectric cell means, and control means operatively connected with said second light source for interrupting said additional light no later than the time of interruption of said printing light.

2. An apparatus for producing photographic prints from a transparency on light-sensitive printing material comprising a first light source for producing printing light which impinges on the printing material after having passed through the transparency to be printed, a second light source for producing additional light which impinges on the printing material without having passed through said transparency, photoelectric exposure regulating means with photoelectric cell means positioned for measuring the quantity of printing and additional light impinging upon said printing material, said photoelectric exposure regulating means controlling said first light source for automatically interrupting the exposure of said printing material to said printing light after a predetermined total quantity of both said printing light and said additional light has fallen onto said photoelectric cell means, additional means controlling said second light source for automatically interrupting the exposure of said printing material by said additional light after a predetermined time of exposure of said printing material by said additional light, said predetermined time of exposure terminating no later than the time of interruption of said printing light, and adjustable means operatively associated with said second light source for varying the amount of additional light falling upon the printing material in the course of a printing process.

3. An apparatus for producing photographic prints from a transparency on light-sensitive printing material comprising a first light source for producing printing light which impinges on said printing material after having passed through the transparency to be printed, a second light source for producing additional light which impinges on said printing material without having passed through said transparency, first means operatively associated with said first light source for interrupting the exposure of said printing material by said printing light, second means operatively associated with said second light source for interrupting the exposure of said printing material by said additional light independent of said interruption of said printing light, photoelectric exposure regulating means with photoelectric cell means positioned for measuring the quantity of printing and additional light impinging upon said printing material, said photoelectric exposure regulating means controlling said first means for interrupting the exposure of said printing material by said printing light after a predetermined total quantity of both said printing light and said additional light has fallen onto said photoelectric cell means, timing means controlling said second means for automatically interrupting the exposure of said printing material by said additional light after a predetermined time of exposure of said printing material by said additional light, said predetermined time of exposure terminating not later than the time of interruption of said printing light, and adjustable means operatively associated with said second light source for varying the amount of additional light falling upon said printing material in the course of a printing process.

4. An apparatus as claimed in claim 3 wherein said timing means includes an adjustable device for varying the length of the time interval regulated by said timing means.

5. An apparatus producing photographic prints from a transparency on light-sensitive material comprising a first light source emitting printing light which impinges on said printing material after having passed through the transparency to be printed, a second light source emitting additional light which impinges on said printing material without having passed through said transparency, a first current supply circuit connected to said first light source, a first switch connected in said first current supply circuit, a second current supply circuit connected to said second light source, a second switch connected in said second current supply circuit, photoelectric exposure regulating means with photoelectric cell means positioned for measuring the quantity of printing and additional light impinging upon said printing material, said photoelectric exposure regulating means controlling said first switch for opening said switch after a predetermined total quantity of both said printing light and said additional light has fallen onto said photoelectric cell means, timing means controlling said second switch for opening said switch after a predetermined time of exposure of said printing material by said additional light, said predetermined time of exposure terminating not later than the time of interruption of said printing light, and adjustable means operatively associated with said second light source for varying the amount of said additional light falling upon said printing material in the course of a printing process.

6. An apparatus for producing photographic prints from a transparency on light-sensitive printing material comprising a first light source for producing printing light which impinges on said printing material after having passed through the transparency to be printed, a second light source for producing additional light which impinges on said printing material without having passed through said transparency, adjustable means operatively associated with said second light source for varying the amount of additional light falling upon said light sensitive printing material in the course of a printing process, a device for reducing the amount of effective printing light in direct relationship to said amount of additional light so that the sum of all said printing and said additional light falling on the printing material in the course of a printing process is a predetermined quantity independent of the variable amount of additional light, said device including photoelectric exposure regulating means having photoelectric cell means positioned for measuring the quantity of printing and additional light impinging upon said printing material, and said photoelectric exposure regulating means controlling both said first light source and said second light source for automatically and simultaneously interrupting the exposure of said printing material by said printing light and additional light after a predetermined total quantity of both said printing light and said additional light has fallen onto said photoelectric cell means.

References Cited in the file of this patent
UNITED STATES PATENTS

| | | |
|---|---|---|
| 2,352,914 | Rackett | July 4, 1944 |
| 2,668,474 | Rogers | Feb. 9, 1954 |